United States Patent
Gallagher

[11] Patent Number: 5,831,242
[45] Date of Patent: Nov. 3, 1998

[54] WIPER HEATER INSERT

[76] Inventor: Robert L. Gallagher, 2702 S. Cedar Ave., Holmen, Wis. 54636

[21] Appl. No.: 646,637

[22] Filed: May 8, 1996

[51] Int. Cl.[6] .................................. B60L 1/02; A47L 1/00
[52] U.S. Cl. ......................................... 219/202; 15/250.06
[58] Field of Search ..................................... 219/202, 203; 15/250.05, 250.06, 250.07, 250.08, 250.09

[56] References Cited

U.S. PATENT DOCUMENTS

| | | | |
|---|---|---|---|
| 1,721,613 | 7/1929 | Anselm | 15/250.06 |
| 1,739,411 | 12/1929 | Murphy | 15/250.06 |
| 1,768,727 | 7/1930 | Yonan | 15/250.06 |
| 2,422,761 | 6/1947 | Ungerland | 15/250.06 |
| 2,733,472 | 2/1956 | Karstens et al. | 15/250.06 |
| 4,325,160 | 4/1982 | Burgess | 15/250.06 |
| 4,387,290 | 6/1983 | Yasuda | 219/202 |
| 5,221,828 | 6/1993 | Basheer et al. | 219/202 |
| 5,325,561 | 7/1994 | Kotlar | 15/250.06 |
| 5,426,814 | 6/1995 | Minnick | 219/202 |
| 5,488,752 | 2/1996 | Randolph | 219/202 |
| 5,504,965 | 4/1996 | Guell | 15/250.06 |

*Primary Examiner*—Teresa J. Walberg
*Assistant Examiner*—Sam Paik
*Attorney, Agent, or Firm*—Robert J. Harter

[57] ABSTRACT

A wiper heater insert includes a coiled heater wire, slip fit insulator, and an air gap between the heater insert and a longitudinal bore of the wiper. These three features minimize warping caused by thermal expansion and maximize the flexibility of the wiper. A press fit bushing at one end provides a readily removable heater element to minimize the cost of replacing a wiper blade and save wear and tear on the heater insert when it is not needed during the summer.

12 Claims, 3 Drawing Sheets

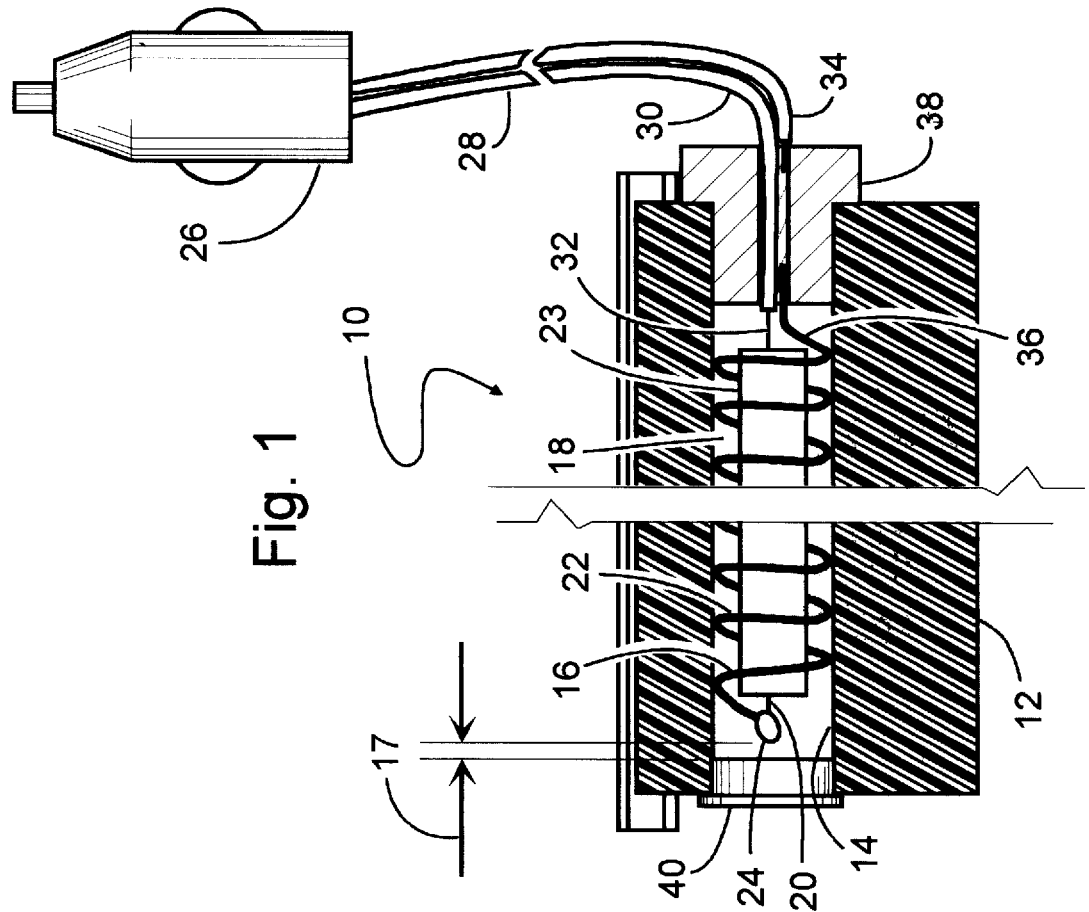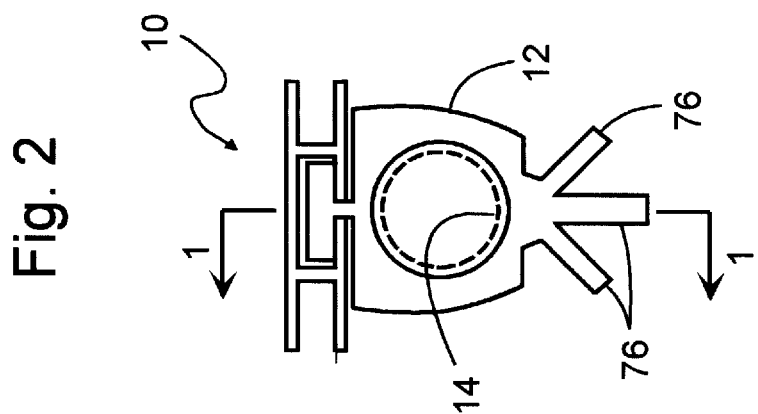

WIPER HEATER INSERT

BACKGROUND OF THE INVENTION

1. Field of the Invention

The subject invention generally pertains to windshield wiper blades, and more specifically to heated wipers.

2. Description of Related Art

Ice accumulation on windshield wiper blades greatly reduces the effectiveness of the wiper. Various heating elements have been integrally incorporated in wiper blades, but this tends to stiffen the blade. Blade flexibility is especially important where the blade reaches the outer edges of the windshield where there is generally the greatest curvature. Fastening a heating element at more than one point within a wiper provides a stiffer assembly much like bonding together a deck of cards. An otherwise flexible deck of cards becomes stiff as a board when glued together. Moreover, even slight thermal expansion with multiple points of attachment results in excessive warping of the wiper blade. Integrally joining a heater element to a wiper also greatly adds to its costs which becomes important as the blades are replaced frequently.

Wipers come in various lengths. The total electrical resistance for longer wipers needs to be less than that for shorter wipers to deliver the same wattage per inch of wiper length. For a given heater wire diameter, this means longer wipers need shorter heater wires. This is difficult to accomplish with existing heated wiper designs that are not coiled.

SUMMARY OF THE INVENTION

To avoid the limitations and problems with present wiper heaters, it is a primary object of the invention to provide a wiper heater insert that allows a wiper blade to be replaced without having to also replace the heater.

Another object of the invention is to provide a wiper heater insert that is coiled for providing spring-like action that not only offers greater flexibility but also allows for thermal expansion differences between the wiper blade and the heater wire.

Another object of the invention is to provide a wiper heater having a press fit bushing that is insertable and removable at one end of a wiper that is furthest away from the upper curved portion of a windshield.

Another object is to provide a radial air gap between an inside bore of a wiper and a wiper heater insert to minimize the stiffness otherwise imparted by a heater element bonded or intimately joined to the wiper.

Another object is to provide a coiled heater for greater flexibility.

Another object is to provide a heater that is coiled so that the length of the coil (i.e., number of turns) can be shorter for wipers that are longer to provide uniform watts/inch for various wiper lengths.

Another object is to provide a heater wire that is attached to a wiper at only one end with an axial gap at an opposite end to allow for thermal expansion.

Another object is to provide a wiper with a heater insert that can be readily removed during the summer to save wear and tear on the heater insert.

Another object is to provide a heater insert that can be used on a conventional, unmodified, off-the-shelf wiper blade.

Another object is to employ a slip fit insulated sheath around a heater wire to minimize stiffness.

Another object is to employ a multiple fin wiper for enhanced heat transfer.

Another object is to provide a wiper heater insert coupled to a cigarette lighter adapter for quick installation when traveling during unexpected adverse weather conditions.

These and other objects of the invention are provided by a novel wiper heater insert that is insertable through one end of a conventional wiper blade and provides a coiled heater wire and an air gap for maximum flexibility.

BRIEF DESCRIPTION OF THE DRAWINGS

FIG. 1 is a cross-sectional view of a wiper heater insert.

FIG. 2 is an end view of FIG. 1.

DESCRIPTION OF THE PREFERRED EMBODIMENT

Figure 3:
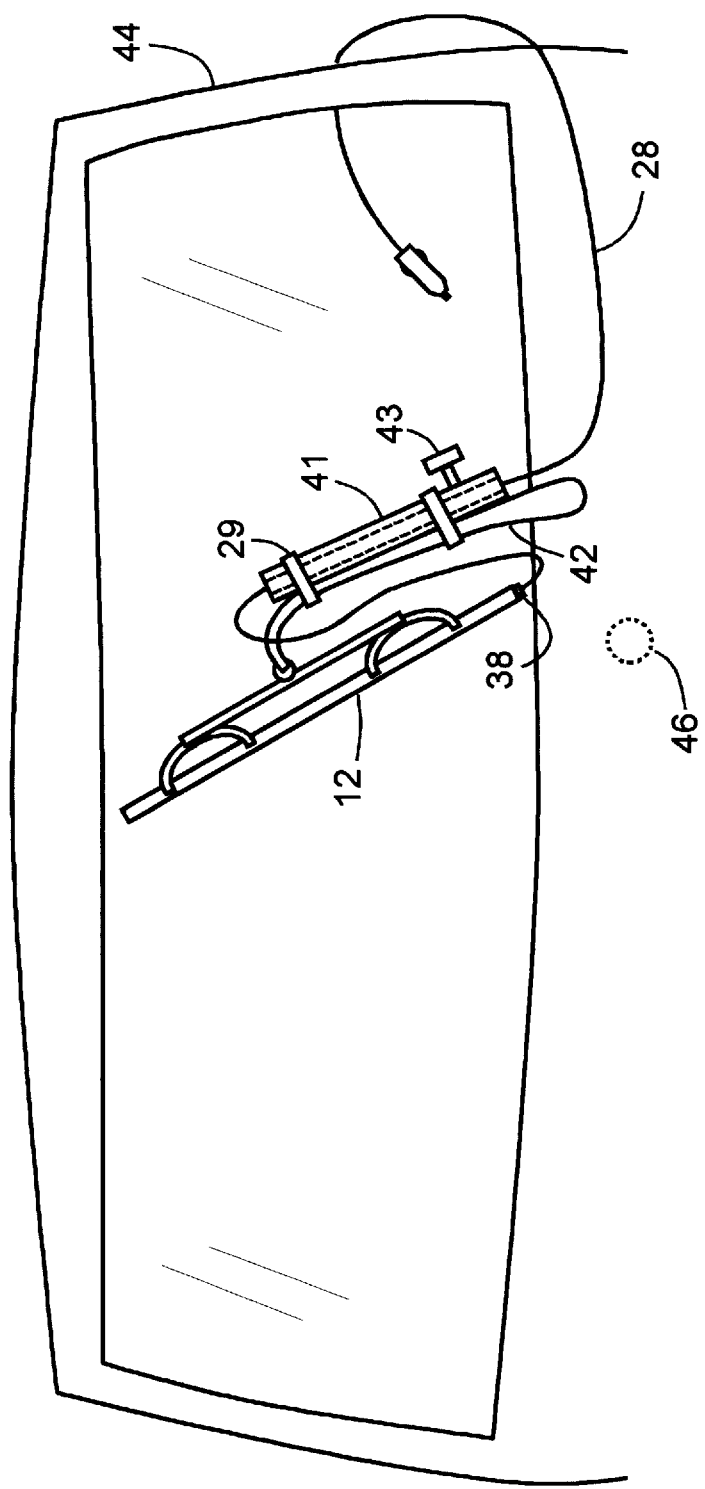
FIG. 3 illustrates the invention attached to a vehicle.

A heater wiper assembly 10 of FIGS. 1 and 2 includes a flexible wiper 12 having a longitudinal bore 14 of approximately 0.125 inches in diameter. In one embodiment of the invention, wiper 12 is described in U.S. Pat. No. 4,473,919 which is specifically incorporated by reference herein. Wiper 12 is identified as a TRIPLEDGE premium silicone refill with "TRIPLEDGE" being a registered trademark of Direct To Retail of Natick, Mass.

An 0.018 inch diameter nickel chromium resistive wire 16 is slipped into bore 14 with a radial air gap 18 defined as the space between wire 16 and bore 14. Air gap 18 is created by the radial cross-sectional area of wire 16 ($0.00025 in^2$) being less than half of the radial cross-sectional area of bore 14 ($0.012 in^2$). Axial clearance 17 allows for thermal expansion. Wire 16 has an electrical resistance of roughly 2 ohms per foot. Wire 16 consists of a substantially straight second pass wire 20 with a longer first pass wire 22 coiled around it. It has been found that for bests results, first pass wire 22 should be at least 30 percent longer than wire 20 to accommodate wipers of various lengths yet provide the same wattage per inch of wiper length. Wires 20 and 22 are joined at one distal end 24 to provide a double-pass configuration through which current may pass along the length of bore 14 and then back again. A conventional electrically insulated heat resistant sheath 23 is slipped over wire 20 to insulate it from wire 22. This arrangement provides a preferred total ohmic value of 2 to 20 ohms.

Wire 16 is electrically coupled to a cigarette lighter adapter 26 by way of a 2-conductor cable 28. One conductor 30 of cable 28 is directly soldered to end 32 of wire 20. The other conductor 34 and end 36 of wire 22 are joined upon both being soldered to an electrically conductive bushing 38. Bushing 38 has an outside diameter that is slightly larger (0.030") than the inside diameter of bore 24 to provide a press fit that helps hold resistive wire 16 within wiper 12. A plug 40 is pressed into bore 14 to help keep contaminates out.

Referring to FIG. 3, a tube 41 is tie wrapped 29 to wiper arm 42. Cable 28 slips between the door and frame of a vehicle 44 and extends into the driver compartment. A driver can then selectively plug adapter 26 into a cigarette lighter receptacle 46 as needed. The inside diameter of tube 41 is larger than bushing 38 so that wire 16 and bushing 38 can slip through it and be completely removed from wiper arm 42 during the summer while leaving tube 41 in place. A conventional thumb screw 43 threaded into tube 41 abuts cable 28 to clamp it in place.

Figure 4:
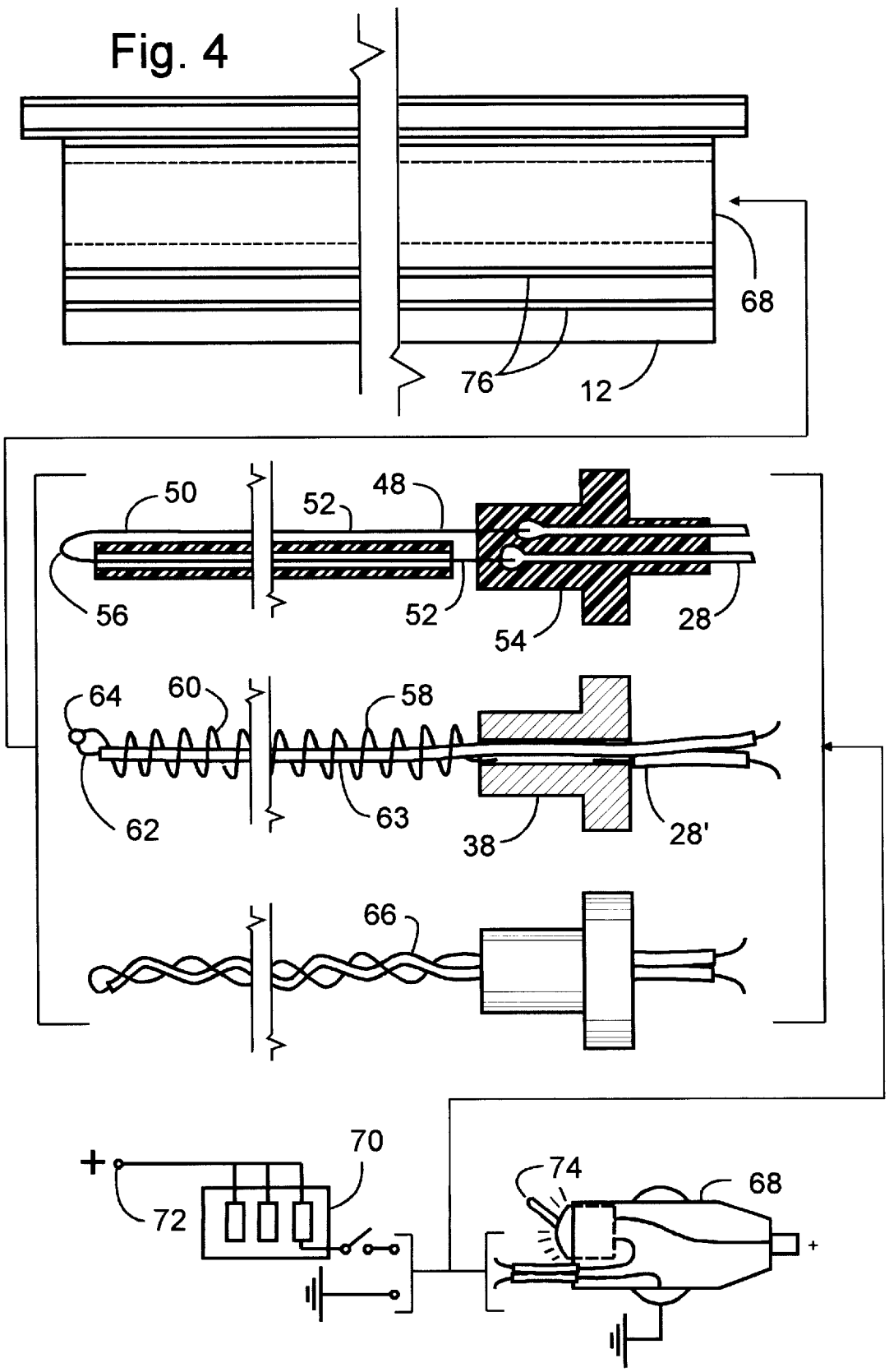
FIG. 4 illustrates multiple embodiments of the invention.

Alternate embodiments of the invention are shown in FIG. 4. A heater insert 48 has a double-pass resistive wire 50 with its first and second pass wires 52 being substantially straight and parallel. Wires 52 are soldered to cable 28 and subsequently disposed within an insulated bushing 54. Heater insert 58 basically represents the embodiment of FIG. 1 but with the silicone insulation of cable 28' extending over center wire 62. In this embodiment, center wire 62 (second wire) is simply an extension of one conductor of 2-conductor cable 28'. Wire 62 is conventional conductive copper stranded wire with silicone insulation and thus nearly all the heat is provided by a resistive wire 60. Wires 60 and 62 are soldered together at point 64. Heater insert 66 is similar to heater insert 58 except with wires 60 and 62 twisted about themselves.

Heater inserts 48, 58 and 66 are each adapted to fit through one end 68 of wiper 12. Heater inserts 48, 58 and 66 are coupled to a cigarette lighter adapter 68 or, in an alternative embodiment, coupled to a vehicle's fuse box 70. Positive pole 72 schematically represents an electric power supply such as a vehicle's battery.

Other features of the invention include an illuminated switch 74 to turn heater inserts 48, 58 or 66 on and off and to provide a visual indication of when it is turned on. In addition, wiper 12 includes a plurality of fins 76 to enhance heat transfer.

Although the invention is described with respect to a preferred embodiment, modifications thereto will be apparent to those skilled in the art. Therefore, the scope of the invention is to be determined by reference to the claims which follow.

I claim:

1. A heated wiper assembly adapted to be coupled to an oscillating wiper arm and a power supply of a vehicle, said power supply adapted to deliver a DC electric current, said heated wiper assembly comprising:

a flexible wiper having therethrough a longitudinal bore of a first radial cross-sectional area;

a heater wire having a first pass wire and a second pass wire disposed in double-pass relationship within said longitudinal bore, whereby said double-pass relationship causes said DC electric current to make two passes through said longitudinal bore, said DC electric current traveling both forward and back through said longitudinal bore, said first pass wire and said second pass wire being joined to each other at a distal end within said longitudinal bore, said first pass wire and said second pass wire each having an opposite end adapted for connection to said electric power supply, said heater wire having a second radial cross-sectional area smaller than half of said first radial cross-sectional area of said longitudinal bore to define a radial air gap therebetween, said longitudinal bore being of sufficient length to provide said heater wire with an axial clearance at said distal end to allow for thermal expansion; and a bushing in press fit relationship within said longitudinal bore and engaged with said heater wire, thereby facilitating the removal of said heater wire from said flexible wiper.

2. The heated wiper assembly of claim 1, wherein said first pass wire is bare and said second pass wire is insulated.

3. The heated wiper assembly of claim 2, wherein said second pass wire is insulated by way of a sheath in slip fit relationship over said second pass wire.

4. The heated wiper assembly of claim 2, wherein said first pass wire is coiled around said second pass wire.

5. The heated wiper assembly of claim 2, wherein said first pass wire and said second pass wire are twisted about each other.

6. The heated wiper assembly of claim 1, further comprising a plurality of fins longitudinally disposed along said flexible wiper.

7. The heated wiper assembly of claim 1, further comprising a plug within said longitudinal bore at one end of said flexible wiper with said plug and said bushing being at opposite ends of said flexible wiper, said plug being spaced apart from said distal end to further define said axial clearance therebetween, whereby said radial air gap and said axial clearance allow for differences in thermal expansion of said flexible wiper and said heater wire.

8. The heated wiper assembly of claim 1, wherein said heater wire has an ohmic value of 2 to 20 ohms as applied across said electric power supply.

9. The heated wiper assembly of claim 1, further comprising a cable, a tube, and a cable lock, said tube being attached to said oscillating wiper arm, said cable passing through said tube and coupling said heater wire to said electric power supply, and said cable lock selectively releasably coupling said cable to said tube, said tube having an inside diameter that is greater than said bushing, whereby said heater wire and said bushing is readily removable from said wiper and said wiper arm while leaving said tube attached to said wiper arm.

10. The heated wiper assembly of claim 1, wherein said first pass wire is at least 30 percent longer than said second pass wire.

11. A heated wiper assembly being adapted to be coupled to an oscillating wiper arm and a power supply of a vehicle, said power supply adapted to deliver a DC electric current, said heated wiper assembly comprising:

a flexible wiper having therethrough a longitudinal bore of a first radial cross-sectional area;

a plurality of fins longitudinally disposed along said flexible wiper, a heater wire having a bare first pass wire coiled around an insulated second pass wire and disposed in double-pass relationship within said longitudinal bore, whereby said double-pass relationship causes said DC electric current to make two passes through said longitudinal bore, said DC electric current traveling both forward and back through said longitudinal bore, said first pass wire and said second pass wire each having one end joined to each other at a distal end within said longitudinal bore and each having an opposite end adapted for connection to an electric power supply, said heater wire having a second radial cross-sectional area smaller than half of said first radial cross-sectional area of said flexible wiper to define a radial air gap therebetween;

a bushing in press fit relationship within said longitudinal bore and engaged with said heater wire, thereby facilitating the removal of said heater wire from said flexible wiper; and a plug within said longitudianal bore at an end of said flexible wiper with said plug and said bushing being at opposite ends of said flexible wiper, said plug being spaced apart from said distal end to define an axial clearance therebetween, whereby said radial air gap and said axial clearance allow for differences in thermal expansion of said flexible wiper and said heater wire.

12. A heated wiper assembly adapted to be coupled to an oscillating wiper arm and a power supply of a vehicle, said power supply adapted to deliver a DC electric current, said heated wiper assembly comprising:

a flexible wiper having therethrough a longitudinal bore of a first radial cross-sectional area;

a plurality of fins longitudinally disposed along said flexible wiper;

a heater wire having a first pass wire and a second pass wire disposed in double-pass relationship slip fitted within said longitudinal bore, whereby said double-pass relationship causes said DC electric current to make two passes through said longitudinal bore, said DC electric current traveling both forward and back through said longitudinal bore, said first pass wire and said second pass wire being joined to each other at a distal end within said longitudinal bore, said first pass wire and said second pass wire each having an opposite end adapted for connection to said electric power supply, said first pass wire being at least 30 percent longer than said second pass wire, said first pass wire being coiled around said second pass wire, said heater wire having a second radial cross-sectional area smaller than half of said first radial cross-sectional area of said longitudinal bore to define a axial air gap therebetween;

a bushing in press fit relationship within said longitudinal bore and engaged with said heater wire, thereby facilitating the removal of said heater wire from said flexible wiper; and a plug within said longitudinal bore at an end of said flexible wiper with said plug and said bushing being at opposite ends of said flexible wiper, said plug being spaced apart from said distal end to define an axial clearance therebetween, whereby said radial air gap and said axial clearance allow for differences in thermal expansion of said flexible wiper and said heater wire.

* * * * *